Figure 1:
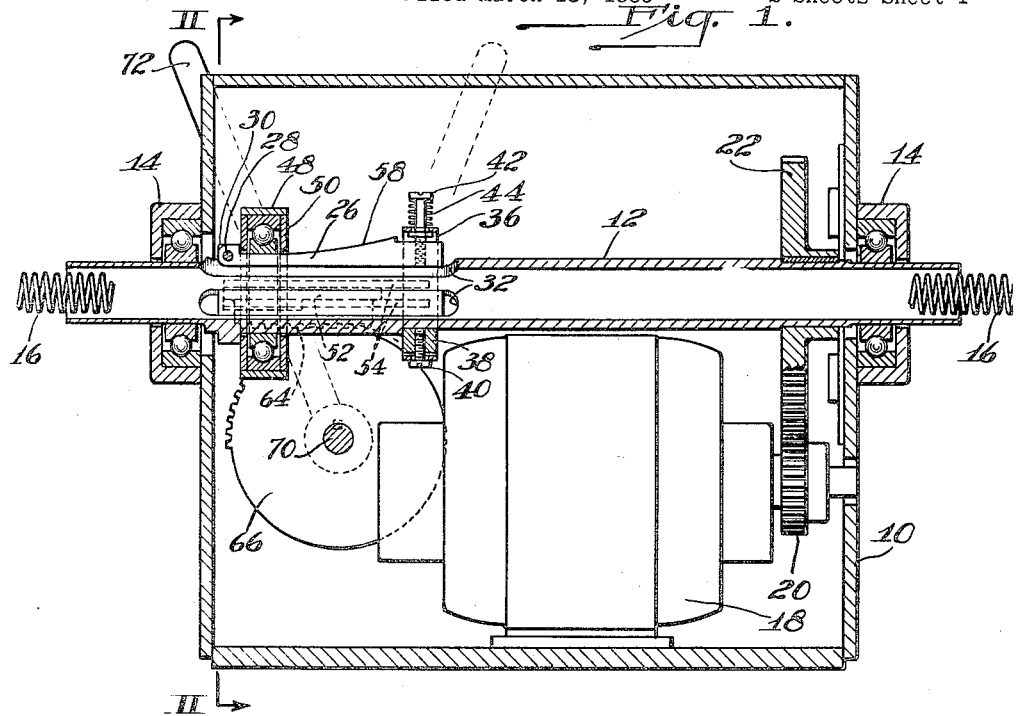

Dec. 16, 1941.  K. I. ROBINSON ET AL  2,266,659
CHUCK
Filed March 18, 1939    2 Sheets-Sheet 1

INVENTORS
Kyle I. Robinson
Lawrence R. Robinson
BY Brown, Critchlow & Flick
their ATTORNEYS.

Dec. 16, 1941.　　K. I. ROBINSON ET AL　　2,266,659
CHUCK
Filed March 18, 1939　　2 Sheets-Sheet 2
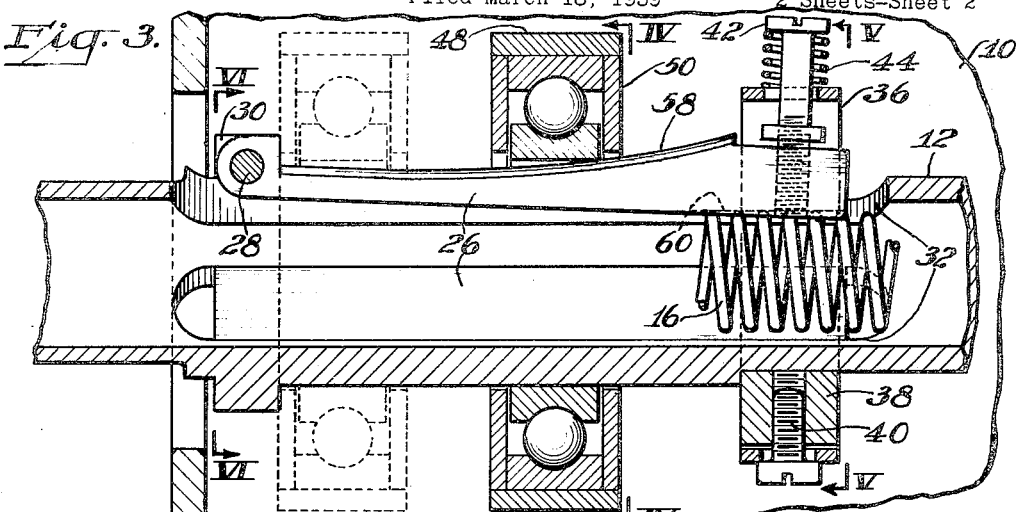
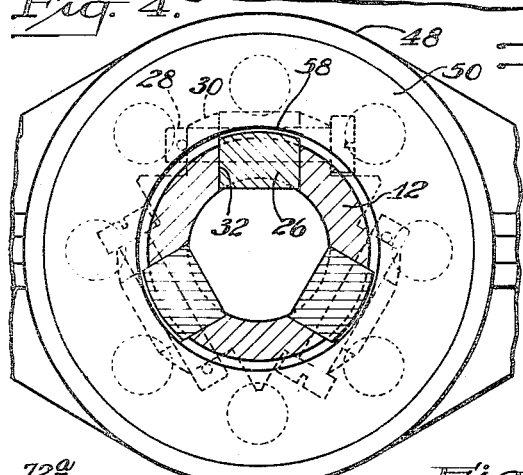
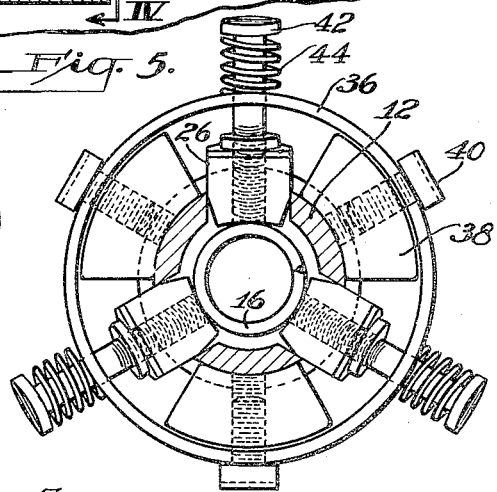
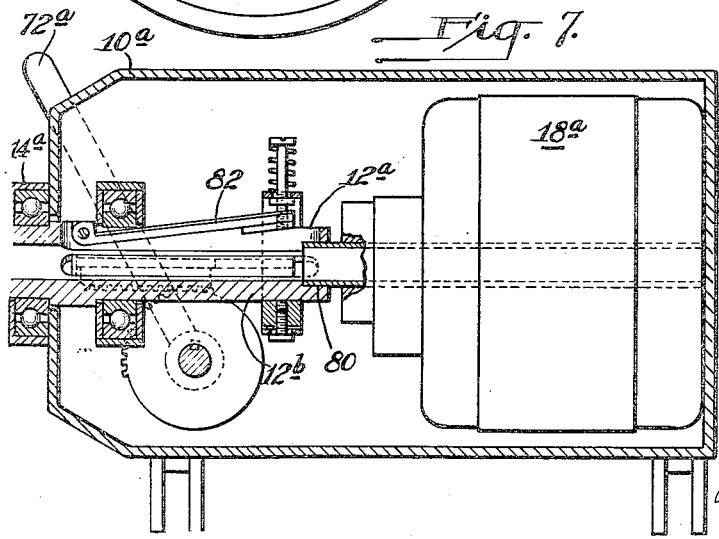
INVENTORS
Kyle I. Robinson
Lawrence R. Robinson
By Brown, Critchlow & Flick
their ATTORNEYS.

Patented Dec. 16, 1941

2,266,659

UNITED STATES PATENT OFFICE 2,266,659

CHUCK

Kyle I. Robinson, Bolivar, and Lawrence R. Robinson, Zelienople, Pa., assignors to Pittsburgh Pipe Cleaner Company, Pittsburgh, Pa., a corporation of Pennsylvania Application March 18, 1939, Serial No. 262,680

2 Claims. (Cl. 279—37)

This invention relates to apparatus for releasably driving a flexible shaft, and more particularly is concerned with apparatus of this type adapted to rotate a helically coiled wire of the type used in cleaning conduits or the like.

It is the general object of our invention to provide an improved, relatively-inexpensive, portable apparatus for rotatably and releasably driving a flexible shaft and adapted for example, to clean conduits or the like.

Another object of our invention is the provision of apparatus including a driven hollow shaft adapted to receive a flexible shaft which can be pushed into and through the hollow shaft, and which apparatus includes a particularly efficient clutch mechanism for releasably securing the flexible shaft to the hollow shaft.

Another object of our invention is to provide an efficient, light-weight, portable apparatus for cleaning conduits or the like, and adapted to releasably and rotatably drive a helically coiled spring member or flexible shaft, and wherein the flexible shaft extends through the center of the motor so as to reduce to a minimum the number of working parts and the space and weight of the parts.

The foregoing and other objects of our invention are achieved by an apparatus for releasably driving a flexible shaft comprising, a hollow shaft, means for journaling the hollow shaft in the housing so that a flexible shaft can be pushed into and through the hollow shaft, a motor contained in the housing, means operatively connecting the hollow shaft and the motor so that rotation of the motor rotates the hollow shaft, a clutch on the hollow shaft within the housing, and means operable from outside the housing for operating the clutch to grip or release the flexible shaft. The clutch includes a plurality of cam fingers pivotally secured to the shaft and movable radially of the shaft to clamp or release the flexible shaft, a frictionless bearing surrounding the fingers, a casing surrounding the bearing, and means slidably mounting the casing in the housing for movement in a plane containing the axis of the hollow shaft. In one embodiment of our invention the motor for driving the hollow shaft is itself provided with a hollow shaft which is adapted to be formed integrally with or connected to the hollow shaft of the apparatus so that the flexible shaft adapted to be releasably driven can be pushed into and through the hollow motor shaft itself.

Figure 2:
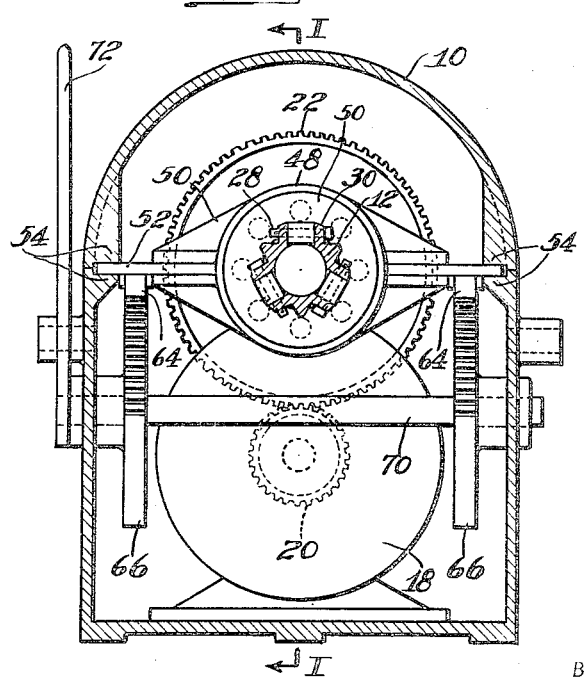
Figure 6:
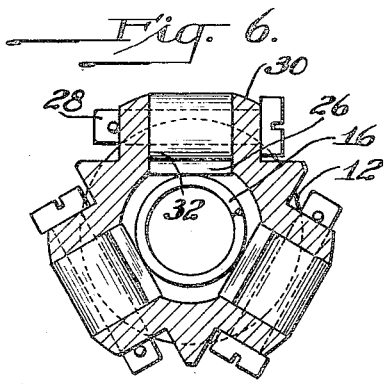

For a better understanding of our invention reference should be had to the accompanying drawings wherein Fig. 1 is a longitudinal vertical sectional view of one embodiment of the invention as taken on line I—I of Fig. 2; Fig. 2 is a vertical transverse cross-sectional view taken on the line II—II of Fig. 1; Fig. 3 is an enlarged fragmentary view of the clutch mechanism shown in Fig. 1; Fig. 4 is a transverse cross-sectional view taken on the line IV—IV of Fig. 3; Fig. 5 is a cross-sectional view taken on the line V—V of Fig. 3; Fig. 6 is a cross-sectional view taken on the line VI—VI of Fig. 3; and Fig. 7 is a longitudinal vertical sectional view similar to Fig. 1, but of a second embodiment of the invention.

Although our invention is adapted broadly to releasably drive shafts, wires, springs, flexible shafts, and the like, it is particularly beneficial when used in conjunction with a helically coiled elongated member to clean conduits and to perform similar operations. Accordingly, our invention has been illustrated in conjunction with a helically coiled elongated member particularly adapted to be rotated upon its axis and moved longitudinally of its axis to clean out a stopped up pipe or other conduit and our invention will be correspondingly described.

In the drawings, the numeral 10 indicates generally a housing usually made of a light weight metal, such as aluminum or an alloy thereof, and which is of a size and shape particularly adapting the apparatus as a whole to be portable and readily handled. Received within the housing 10 is a hollow shaft 12 which preferably extends continuously through the housing in the manner shown and is journaled for rotary movement in the housing, as by the provision of bearings 14 of any standard type which are secured to the housing and rotatably receive the shaft. The hollow bore of the shaft 12 is made of such size that it can readily receive a flexible shaft in the nature of a helically coiled elongated member, indicated by the numeral 16, and shown broken away to permit a clear illustration of the parts of the apparatus proper. Although the exact dimensions of the bore of the hollow shaft 12, and correspondingly of the coiled elongated member or flexible shaft 16 can be widely varied depending upon the particular use to which the apparatus is to be put, as one example of these dimensions we may form the hollow shaft 12 with an internal diameter of 1 and ⅛ inches which adapts the apparatus to receive a flexible shaft 16 of from approximately 1 inch in diameter to ½ inch in diameter.

The hollow shaft 12 is adapted to be rotatably driven and to this end a motor 18 is secured in the housing. Means for operatively connecting the motor 18 with the hollow shaft 12 conveniently comprise a spur gear 20 secured to the shaft of the motor and engaging with a gear 22 keyed to the hollow shaft 12. It will be noted that the hollow shaft 12 is journaled as close as possible to the motor 18 so that the size of the housing 10 is kept at a minimum.

An important part of the invention is the provision of a particular type of clutch mechanism which is capable of being operated from outside of the housing and which is associated with the hollow shaft 12 so as to grip or release a flexible shaft 16 of a size varying within the limitations already stated. Particularly, the clutch includes a plurality of cam fingers 26, usually three in number, each of which is pivotally secured as by a pin 28 to radially extending lugs 30 formed at the sides of slots 32. The slots 32 are positioned at spaced points around the hollow shaft and extend longitudinally of the shaft a sufficient distance to allow the cam fingers 26 to move radially of the hollow shaft to grip or release the flexible shaft 16 extending through the hollow shaft 12.

The ends of the cam fingers 26 remote from the pivot pins 28 are resiliently positioned outwardly of the hollow shaft 12 by any suitable means. This means may include, as shown in Fig. 5, a ring 36 which is held in concentric relation to the hollow shaft 12 by means of segmental plugs 38 which are welded or otherwise secured to the hollow shaft. Cap screws 40 may be used to secure the ring 36 to the plugs 38. From Figs. 5 and 6 it will be seen that the segmental plugs 38 are positioned between the ends of the cam fingers 26 and that screws 42, which are secured in the ends of the cam fingers 26 in directions at right angles to the length of the fingers, extend through suitable openings in the ring 36. Compression springs 44 positioned between the heads of the screws 42 and the circular ring 36 act to resiliently hold the unpivoted ends of the fingers 26 in a radially outward position relative to the internal bore of the hollow shaft 12.

A frictionless bearing of circular shape, and indentified as a whole by the numeral 48, surrounds the plurality of cam fingers carried by the hollow shaft 12 and this bearing is in turn received by a casing 50 having laterally extending plate portions 52 which lie in a plane containing or parallel to the axis of the hollow shaft. The laterally extending plate portions 52 of the casing 50 are slidably received in guides 54 formed in the housing 10. In this manner movement of the casing 50 towards the unpivoted end of the cam fingers 26 causes the frictionless bearing 48 to ride up on curved cam surfaces 58 on the radially outer portions of the cam fingers. This causes the unpivoted ends of the cam fingers 26 to move radially into the bore of the hollow shaft 12 so that the cam fingers grip and clamp the flexible shaft 16 extending through the hollow shaft. The radially inner portions of the unpivoted ends of the cam fingers are preferably formed with a transversely arcuate and longitudinal beveled surface, indicated by the dotted line 60, so that the engagement between the cam fingers and a standard flexible shaft 16 is over a relatively long longitudinal area. The radially inward movement of the unpivoted ends of the cam fingers 26 causes the compression of spring 44 and the energies stored in the springs cause the movement of the free ends of the fingers apart when the bearing 48 is moved from the solid to the dotted line position shown in Fig. 3.

The movement of the frictionless bearing 48 longitudinally of the hollow shaft 12 is achieved by moving the casing 50 in the guides 54. One satisfactory manner of accomplishing the desirable movement is by providing racks 64 on the bottom of the plate extensions 52 which racks engage with gears 66 keyed to a transverse shaft 70 journaled in the housing 10. A handle 72 secured to one end of the shaft 70 controls the rotation of the gears 66 and thus the position of the casing 50 and the action of clutch or gripping mechanism.

From the foregoing it will be recognized that the objects of our invention have been achieved by the provision of a relatively inexpensive, easily operated and light-weight apparatus for releasably driving flexible shafts and particularly helically coiled elongated members. In the use of the apparatus the helically coiled elongated member or flexible shaft is inserted into one end of the hollow shaft 12 and is moved through the shaft until the desired length of flexible cable extends out of one or both ends of the shaft. When the apparatus is used to clean conduits the end of the flexible shaft 16 is moved completely up to the obstruction in the conduit and one or more additional feet of the flexible shaft is then pushed on through the hollow shaft 12 so that an additional pressure is applied against the conduit obstruction due to the inherent resiliency of the flexible shaft. Thereupon, the motor 18 is started and the clutch control handle 72 is thrown to the clamping position which causes the frictionless bearing 48 to ride up on the cam surfaces 58 and thereby push the fingers 26 down into gripping and clamping relation with the flexible shaft 16. In the reversal of the movement of the casing 50 the frictionless bearing 48 moves toward the pivoted ends of the fingers 26 to thereby release the grip of the fingers on the flexible shaft. The flexible shaft 16 can then be fed further through the hollow shaft 12 and a new bite taken on the flexible shaft by the clutch. This operation is repeated as often as necessary to obtain the desired conduit cleaning or other action.

The construction of the embodiment of our invention shown in Fig. 7 is very similar to that shown in Figs. 1 to 6 but comprises a simpler and generally a less bulky and less powerful apparatus than the apparatus of Figs. 1 to 6. A detailed description of the apparatus of Fig. 7 is not necessary because of the similarity of the structure of Fig. 7 to that already described in conjunction with the apparatus of Figs. 1 to 6. However, one important difference between the two apparatus is that the apparatus of Fig. 7 includes a motor 18a formed with a hollow shaft 12a which runs directly through the axis and commutator of the motor. By this arrangement of parts the extra hollow shaft positioned in offset relation to the motor of the apparatus is rendered unnecessary. Thus considerable space is saved and the size and weight of the apparatus as a whole can be reduced. The end of the shaft 12a is secured to a shaft 12b in end-to-end relation and this may be accomplished in any known manner, as for example, by forming the shaft 12b with a counterbore 80 which receives the end of the shaft 12a. The counterbore 80 is formed with keys, splines, or other means for locking the shafts 12a and 12b together for simultaneous rotation. The end of the shaft 12b remote from the shaft 12a is journaled in the housing 10a by a suitable bearing 14a. The clutch mechanism, indicated as a whole by the numeral 82, is exactly the same as the clutch mechanism already described in conjunction with the form of our invention illustrated in Figs. 1 to 6 and hence will not again be described. Suffice it to say here that the clutch mechanism 82 is controlled from outside of the housing 10a by an operating handle 72a.

We have found with the apparatus constructed and operated as above described that most any type of conduit cleaning operation can be performed. The apparatus is adapted to drive flexible shafts of a relatively wide variety of diameters through conduits including traps, scale, and other obstructions. The apparatus is portable, easily operated, and relatively inexpensive and obviously can be used in other relations than conduit cleaning. In conduit cleaning, the flexible shaft being driven can be provided with cutters, brushes, or other means as will be evident.

Although we have in accordance with the patent statutes particularly illustrated and described our invention it should be understood that our invention is not to be limited thereto or thereby but is defined in the appended claims.

We claim:

1. Apparatus for releasably driving a flexible shaft, or the like, comprising a rotatable hollow shaft through which a flexible shaft can be pushed, a clutch on the hollow shaft, said clutch including a plurality of cam fingers pivotally secured to the shaft and movable radially of the shaft to clamp or release the flexible shaft, an endless anti-friction bearing surrounding the fingers, a casing surrounding the bearing, a plurality of means slidably mounting the casing for movement axially of the hollow shaft, and rack and gear means disposed on opposite sides of said hollow shaft for controlling the position of the casing for thereby moving the anti-friction bearing on the cam fingers to grip or release the flexible shaft.

2. Apparatus for releasably driving a flexible shaft, or the like, comprising a rotatable hollow shaft through which a flexible shaft can be pushed, a clutch on the hollow shaft, said clutch including a plurality of cam fingers pivotally secured to the shaft and movable radially of the shaft to clamp or release the flexible shaft, an endless bearing surrounding the fingers, a casing surrounding the bearing, a plurality of means slidably mounting the casing for movement axially of the hollow shaft, and rack and gear means disposed on opposite sides of said hollow shaft for controlling the position of the casing for thereby moving the bearing on the cam fingers to grip or release the flexible shaft.

KYLE I. ROBINSON.
LAWRENCE R. ROBINSON.